United States Patent
Horn et al.

(10) Patent No.: US 7,005,471 B2
(45) Date of Patent: Feb. 28, 2006

(54) FLAME-RETARDED POLY(ESTER)CARBONATES

(75) Inventors: Klaus Horn, Dormagen (DE); Hans Franssen, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 45 days.

(21) Appl. No.: 10/683,245

(22) Filed: Oct. 10, 2003

(65) Prior Publication Data
US 2005/0043469 A1 Feb. 24, 2005

(30) Foreign Application Priority Data
Oct. 14, 2002 (DE) ................................ 102 47 777

(51) Int. Cl.
*C08L 69/00* (2006.01)

(52) U.S. Cl. ........................ 524/537; 524/502; 525/146

(58) Field of Classification Search ................ 524/537, 524/502; 525/146
See application file for complete search history.

(56) References Cited

U.S. PATENT DOCUMENTS

| 3,926,908 A | 12/1975 | Mark | 260/45.7 S |
|---|---|---|---|
| 3,933,734 A | 1/1976 | Mark et al. | 260/45.7 S |
| 3,940,366 A | 2/1976 | Mark | 260/45.9 R |
| 3,953,399 A | 4/1976 | Mark | 260/45.85 H |
| 4,104,246 A | 8/1978 | Mark | 260/45.7 S |
| 4,366,276 A * | 12/1982 | Freitag et al. | 524/94 |
| 5,521,230 A * | 5/1996 | Bhatia et al. | 523/328 |
| 5,777,009 A * | 7/1998 | Pan et al. | 524/164 |
| 5,804,654 A | 9/1998 | Lo et al. | 525/67 |
| 6,025,441 A | 2/2000 | Koshirai et al. | 525/199 |
| 6,180,702 B1 | 1/2001 | Chung et al. | 524/161 |
| 6,204,313 B1 * | 3/2001 | Bastiaens et al. | 524/100 |
| 6,462,111 B1 * | 10/2002 | Singh et al. | 524/108 |

FOREIGN PATENT DOCUMENTS

| EP | 899 303 | 3/1999 |
|---|---|---|
| WO | 02/50185 | 6/2002 |

* cited by examiner

*Primary Examiner*—David W. Wu
*Assistant Examiner*—Henry S. Hu
(74) *Attorney, Agent, or Firm*—Joseph C. Gil; James R. Franks; Aron Preis

(57) ABSTRACT

A thermoplastic molding composition comprising poly(ester)carbonate is disclosed. The composition that is characterized by its flame resistance contains a PTFE blend in an amount of 0.2 to 0.6% and an organic salt of an alkali metal or alkaline earth metal in an amount of 0.01 to 0.1%. The PTFE blend contains a blending partner and PTFE wherein amount of PTFE is 30 to 70% relative to the weight of the PTFE blend.

15 Claims, No Drawings

FLAME-RETARDED POLY(ESTER)CARBONATES

FIELD OF THE INVENTION

The invention relates to thermoplastic molding compositions and more particularly to flame-retarded compositions prepared from poly(ester)carbonate.

SUMMARY OF THE INVENTION

A thermoplastic molding composition comprising poly (ester)carbonate is disclosed. The composition that is characterized by its flame resistance contains a PTFE blend in an amount of 0.2 to 0.6% and an organic salt of an alkali metal or alkaline earth metal in an amount of 0.01 to 0.1%. The PTFE blend contains a blending partner and PTFE wherein amount of PTFE is 30 to 70% relative to the weight of the PTFE blend.

BACKGROUND OF THE INVENTION

The effect of organic salts as a flame-retardant additive for polycarbonates (PCs) or polyester carbonates (PECs) is known and is described in, for example, U.S. Pat. No. 3,933,734, U.S. Pat. No. 3,940,366, U.S. Pat. No. 3,953,399 and U.S. Pat. No. 3,926,908 as well as U.S. Pat. No. 4,104,246.

In addition to flammability the conventional fire tests evaluate the tendency to form drips and ignite that which lies below. In order to prevent dripping, anti-dripping agents such as, for example, PTFE, are conventionally added to the PCs or PECs. When incorporating PTFE into PCs or PECs, agglomeration of the PTFE particles occurs as the compounding takes place, which results in streaking and pimpling on the surface of the molding.

U.S. Pat. No. 5,804,654, EP-A 0 899 303 and EP-A 0 822 226 describe the possibility of utilising PTFE blends in order to avoid these negative effects. Corresponding products are commercially obtainable, for example under the names Metablen A-Series, from Mitsubishi Rayon, or Blendex B449, from GE.

WO-A 01/10957 describes mixtures of PC or PEC and a PTFE blend based on an acrylate copolymer and salts. However, these mixtures show a flame-retardant effect only when the sum of the contents of salts and PTFE blend is >0.65 wt. % and the PTFE content of the PTFE blends is less than 30 wt. %. A V-0 rating is achieved in the UL Test at wall thicknesses greater than 1.6 mm.

For reasons of cost and resources, however, it is fundamentally desirable to achieve satisfactory flame-proofing using the smallest possible quantities of additives.

Proceeding from the prior art, therefore, the object was to provide a composition which makes possible a satisfactory flame-retardant effect while using small quantities of additives.

DETAILED DESCRIPTION OF THE INVENTION

This object is surprisingly achieved by the compositions according to the invention.

It has surprisingly been found that in combination with from 0.2 to 0.6 wt. %, preferably 0.3 to 0.5 wt. % PTFE blends, as well as with small quantities, that is to say quantities of from 0.01 to 0.1 wt. %, preferably 0.01 to 0.08 wt. %, particularly preferably 0.01 to 0.06 wt. % and most particularly preferably 0.01 to 0.03 wt. %, of specified organic flame-retardant salts, wherein the sum of both additives is preferably less than 0.65% per weight of the composition, aromatic polycarbonates and polyester carbonates extinguish measurably faster, and in the flammability test in accordance with UL 94 a V-0 rating is achieved at low wall thicknesses of up to 1.2 mm and a 5VB at wall thicknesses of up to 2.0 mm. Surprisingly, it has therefore been found that as a result of the combination of salt and PTFE blend the PTFE component no longer acts predominantly as an anti-dripping agent but that the flaming persistence time is furthermore reduced to an extent such that only the further addition of a very small quantity of salt is necessary in order to achieve flame-proofing comparable in effectiveness to that of pure PTFE and high quantities of salt. The flammability is reduced to values such as cannot be obtained by the addition of the same quantities of salt and pure PTFE.

This is all the more surprising because smaller quantities of salt are conventionally more difficult to distribute through the mixture. Those skilled in the art would expect the concentrations according to the invention to be ineffective.

The necessary additives are moreover readily accessible, being commercially obtainable, and utilising them in these quantities is also highly economical.

The present invention furthermore provides a process for the preparation of the polycarbonate and polyester carbonate molding compositions according to the invention, characterised in that the salts are mixed in conventional manner in combination with suitable PTFE blends, either as they are or in the form of a polycarbonate concentrate or polyester carbonate concentrate, and are melt-compounded in suitable manner.

The use of the compositions according to the invention for the preparation of molded articles and extrudates, as well as the moldings and extrudates prepared from the compositions according to the invention, are likewise provided by this application.

Thermoplastic aromatic polycarbonates within the meaning of the present invention are both homopolycarbonates and also copolycarbonates; the polycarbonates may be straight-chain or branched in known manner.

Some, up to 80 mol. %, preferably from 20 mol. % to 50 mol. %, of the carbonate groups in the polycarbonates which are suitable according to the invention may be replaced with aromatic dicarboxylic acid ester groups. Such polycarbonates, which comprise incorporated into the molecule chain both acid radicals of carbon dioxide and acid radicals of aromatic dicarboxylic acids are, strictly speaking, aromatic polyester carbonates. For the sake of simplicity, in the present application they are to be subsumed in the generic term of the thermoplastic aromatic polycarbonates.

The polycarbonates which are to be used according to the invention are prepared in known manner from diphenols, carbon dioxide derivatives, optionally chain terminators and optionally branching agents, wherein for the preparation of the polyester carbonates some of the carbon dioxide derivatives are replaced with aromatic dicarboxylic acids or derivatives of the dicarboxylic acids, and specifically according to the carbonate structural units which are to be replaced in the aromatic polycarbonates, with aromatic dicarboxylic acid ester structural units.

Detailed information on polycarbonate preparation has been recorded in hundreds of patent specifications over the past 40 or so years. Reference might be made here to these few examples:

Schnell, "Chemistry and Physics of Polycarbonates", Polymer Reviews, Vol. 9, Interscience Publishers, New York, London, Sydney 1964;

D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 19, 75–90 (1980)";

D. Freitag, U. Grigo, P. R. Müller, N. Nouverntné, BAYER AG, "Polycarbonates" in Encyclopedia of Polymer Science and Engineering, Volume 11, Second Edition, 1988, pages 648–718, and finally Drs. U. Grigo, K. Kircher and P. R. Müller "Polycarbonate" in Becker/Braun, Kunststoff-Handbuch, Vol. 3/1, Polycarbonates, Polyacetals, Polyesters, Cellulose Esters, Carl Hanser Verlag Munich, Vienna 1992, pages 117–299.

The thermoplastic polycarbonates including the thermoplastic aromatic polyester carbonates have weight average molecular weights—$M_w$—(determined by measurement of the relative viscosity at 25° C. in $CH_2Cl_2$ and at a concentration of 0.5 g per 100 ml $CH_2Cl_2$) of 12 000 to 120 000, Preferably 15 000 to 80 000 and in particular 22 000 to 60 000.

Diphenols which are suitable for the preparation of the polycarbonates which are to be used according to the invention are, for example, hydroquinone, resorcinol, dihydroxydiphenyl, bis(hydroxyphenyl) alkanes, bis(hydroxyphenyl) cycloalkanes, bis(hydroxyphenyl) sulfides, bis(hydroxyphenyl) ethers, bis(hydroxyphenyl) ketones, bis (hydroxyphenyl) sulfones, bis(hydroxyphenyl) sulfoxides, α,α'-bis(hydroxyphenyl) diisopropylbenzenes, as well as compounds thereof which are alkylated in the ring and halogenated in the ring.

Preferred diphenols are 4,4'-dihydroxydiphenyl, 2,2-bis (4-hydroxyphenyl)-1-phenyl propane, 1,1-bis(4-hydroxyphenyl) phenyl ethane, 2,2-bis(4-hydroxyphenyl) propane, 2,4-bis(4-hydroxyphenyl)-2-methyl butane, 1,1-bis(4-hydroxyphenyl)-m/p-diisopropyl benzene, 2,2-bis(3-methyl-4-hydroxyphenyl) propane, bis(3,5-dimethyl(4-hydroxyphenyl) methane, 2,2-bis(3,5-dimethyl-4-hydroxyphenyl) propane, bis(3,5-dimethyl-4-hydroxyphenyl) sulfone, 2,4-bis(3,5-dimethyl-4-hydroxyphenyl)-2-methyl butane, 1,1-bis(3,5-dimethyl-4-hydroxyphenyl)-m/p-diisopropyl benzene, 2,2- and 1,1-bis((4-hydroxyphenyl)-3,3,5-trimethylcyclohexane.

Particularly preferred diphenols are 4,4'-dihydroxydiphenyl, 1,1-bis(4-hydroxyphenyl) phenyl ethane, 2,2-bis(4-hydroxyphenyl) propane, 2,2-bis(3,5 -dimethyl-4-hydroxyphenyl) propane, 1,1-bis(4-hydroxyphenyl) cyclohexane and 1,1-bis(4-hydroxyphenyl)-3,3,5-trimethyl cyclohexane.

These and further suitable diphenols are described in, for example, U.S. Pat. No. 3,028,635, U.S. Pat. No. 2,999,835, U.S. Pat. No. 3,148,172, U.S. Pat. No. 2,991,273, U.S. Pat. No. 3,271,367, U.S. Pat. No. 4,982,014 and U.S. Pat. No. 2,999,846, in German published applications DE-A-1 570 703, DE-A-2 063 050, DE-A-2 036 052, DE-A-2 211 956 and DE-A-3 832 396, French patent application FR-A-1 561 518, in the monograph "H. Schnell, Chemistry and Physics of Polycarbonates, Interscience Publishers, New York 1964" as well as in Japanese published applications 62039/1986, 62040/1986 and 105550/1986.

In the case of the homopolycarbonates only one diphenol is utilised, in the case of the copolycarbonates a plurality of diphenols are utilised, naturally with the possibility of the bisphenols which are used being contaminated, as is also the case with all the other chemicals and auxiliary substances added to the synthesis, with impurities deriving from their own synthesis, although it is desirable to work with raw materials which are as clean as possible.

Suitable chain terminators are both monophenols and also monocarboxylic acids. Suitable monophenols are phenol, alkyl phenols such as cresols, p-tert.-butylphenol, p-n-octylphenol, p-iso-octylphenol, p-n-nonylphenol and p-iso-nonylphenol, halophenols such as p-chlorophenol, 2,4-dichlorophenol, p-bromophenol and 2,4,6-tribromophenol, or mixtures thereof.

Suitable monocarboxylic acids are benzoic acid, alkylbenzoic acids and halobenzoic acids.

Preferred chain terminators are the phenols which correspond to the formula (I)

$R^2$—Ph-OH (I)

in which $R^2$ stands for H or a branched or unbranched $C_1$–$C_{18}$-alkyl radical.

The quantity of chain terminator to be utilised is from 0.5 mol. % to 10 mol. %, in relation to moles of diphenols utilised in each case. The chain terminators may be added before, during or following phosgenation.

Suitable branching agents are the trifunctional or polyfunctional compounds which are known in polycarbonate chemistry, in particular those such as have three or more phenolic OH groups.

Suitable branching agents are, for example, phloroglucin, 4,6-dimethyl-2,4,6-tri-(4-hydroxyphenyl) heptene, 2,4,6-dimethyl-2,4,6-tri(4-hydroxyphenyl) heptane, 1,3,5-tri-(4-hydroxyphenyl) benzene, 1,1,1-tri-(4-hydroxyphenyl) ethane, tri-(4-hydroxyphenyl) phenyl methane, 2,2-bis[4,4-bis(4-hydroxyphenyl)-cyclohexyl]propane, 2,4-bis(4-hydroxyphenyl-isopropyl) phenol, 2,6-bis(2-hydroxy-5'-methylbenzyl)-4-methyl phenol, 2-(4-hydroxyphenyl)-2-(2,4-dihydroxylphenyl) propane, hexa-(4-(4-hydroxyphenyl-isopropyl) phenyl) orthoterephthalic acid ester, tetra-(4-hydroxyphenyl) methane, tetra-(4-(4-hydroxyphenyl-isopropyl) phenoxy) methane and 1,4-bis(4',4''-dihydroxytriphenyl) methyl) benzene as well as 2,4-dihydroxybenzoic acid, tremesic acid, cyanuric chloride and 3,3-bis(3-methyl-4-hydroxyphenyl)-2-oxo-2,3-dihydroindole.

The quantity of the branching agents which are optionally to be utilised is from 0.05 mol. % to 2.5 mol. %, in turn in relation to moles of diphenols utilised in each case.

The branching agents may either be introduced with the diphenols and the chain terminators in the aqueous alkaline phase or they may be added, dissolved in an organic solvent, before phosgenation.

The measures for the preparation of the polycarbonates are familiar to those skilled in the art.

Aromatic dicarboxylic acids which are suitable for the preparation of the polyester carbonates are, for example, phthalic acid, terephthalic acid, isophthalic acid, tert.-butyl-isophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyletherdicarboxylic acid, 4,4'-diphenylsulfonedicarboxylic acid, 2,2-bis(4-carboxyphenyl) propane, trimethyl-3-phenylindane-4, 5'-dicarboxylic acid.

Of the aromatic dicarboxylic acids, terephthalic acid and/or isophthalic acid are particularly preferably utilised.

Derivatives of the dicarboxylic acids are the dicarboxylic acid dihalides and the dicarboxylic acid dialkyl esters, in particular the dicarboxylic acid dichlorides and the dicarboxylic acid dimethyl esters.

The carbonate groups are replaced with the aromatic dicarboxylic acid ester groups in substantially stoichiometric and also quantitative manner, such that the molar ratio of the reagents is also found in the finished polyester carbonate. The aromatic dicarboxylic acid ester groups may be incorporated both in random and also block manner.

Preferred methods of preparing the polycarbonates, including the polyester carbonates, which are to be used according to the invention are the known phase interface process and the known melt transesterification process.

In the former case phosgene preferably serves as the carbon dioxide derivative, in the latter case preferably diphenyl carbonate. Catalysts, solvents, working-up, reaction conditions and the like for the polycarbonate preparation are in both cases adequately described and known.

The molding compositions according to the invention are prepared by adding the PTFE blends and salts according to the invention, for example during synthesis to the melt or during a working-up or concentration step, but also into solution. For example, by adding the PTFE blends and salts according to the invention and optionally further additives, in simultaneous or successive manner, to the polycarbonates, which are dissolved in a polycarbonate solvent, followed by evaporating-off the polycarbonate solvent and isolating the polycarbonate. Alternatively, also by dispensing the PTFE blends and salts according to the invention and optionally further additives into the polycarbonate melt and, following intermixing, isolation of the resulting polycarbonate composition.

The present invention consequently also provides a process for the preparation of the polycarbonate molding compositions according to the invention, which is characterised in that polycarbonates are mixed with the PTFE blends and salts according to the invention in either simultaneous or successive manner, either without solvent or in solution, and the mixtures are then melt-compounded either at temperatures of between 260° C. and 450° C., preferably 260° C. to 420° C. and most particularly preferably 260° C. to 380° C., or melt-extruded at temperatures of between 250° C. and 360° C., or the polycarbonate solutions are concentrated by evaporation and the mixture which is obtained is granulated.

The polycarbonate molding compositions according to the invention may further contain conventional additives for their art—recognized function in the context of the polycarbonate art, such as glass fibres, fillers, pigments, UV stabilizers, heat stabilizers, antioxidants, flame retardants, impact modifiers and optionally other mold release agents, in the quantities which are conventional for thermoplastic polycarbonates.

Suitable PTFE blends within the meaning of the invention are any physical mixtures of PTFE with a layer substance which envelopes the PTFE chains and which is compatible with polycarbonate or polyester carbonate and PTFE and leaves the fibril structure of the PTFE chains unchanged within the envelopment. Suitable substances are, for example, polyvinyl derivatives, preferably SAN and polyacrylates. PTFE is present in these blends in proportions of from 30 to 70 wt. %, preferably 40 to 60 wt. % and most particularly from 40 to 55 wt. %. Such blends are commercially obtainable, for example under the trade names Blendex B449 from GE Speciality Chemicals or the Metablen-A Series from Mitsubishi Rayon. The blends are prepared by mixing a PTFE emulsion with an emulsion of the suitable blend partner. By means of a suitable process such as coagulation, freeze drying, spray drying and the like, the blend is obtained from the mixture which has been obtained.

The addition of alkali metal or alkaline earth metal salts is known for the preparation of flame-resistant PCs or PECs, for which reference is made to U.S. Pat. No. 3,775,367, U.S. Pat. No. 3,836,490, U.S. Pat. No. 3,9933,734, U.S. Pat. No. 3,940,366, U.S. Pat. No. 3,953,399, U.S. Pat. No. 3,926,908, U.S. Pat. No. 4,104,246, U.S. Pat. No. 4,469,833, U.S. Pat. No. 4,626,563, U.S. Pat. No. 4,254,015, U.S. Pat. No. 4,626,563 and U.S. Pat. No. 4,649,168, for example.

Alkali metal or alkaline earth metal salts of aliphatic or aromatic sulfonic acid derivatives, sulfonamide derivatives and sulfonimide derivatives are suitable, for example:

sodium or potassium perfluorobutane sulfate, sodium or potassium perfluoromethane sulfonate, sodium or potassium perfluorooctane sulfate, sodium- or potassium-2,5-dichlorobenzene sulfate, sodium- or potassium-2,4,5-trichlorobenzene sulfate, sodium or potassium methylphosphonate, sodium- or potassium-(2-phenylethylene) phosphonate, sodium or potassium pentachlorobenzoate, sodium- or potassium-2,4,6-trichlorobenzoate, sodium- or potassium-2,4-dichlorobenzoate, lithium phenylphosphonate, sodium or potassium diphenylsulfone sulfonate, sodium- or potassium-2-formylbenzene sulfonate, sodium- or potassium-(N-benzenesulfonyl) benzene sulfonamide, trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate, sodium or potassium or lithium phosphate, N-(p-tolylsulfonyl)-p-toluenesulfimide potassium salt, N-(N'-benzylaminocarbonyl) sulfanylimide potassium salt.

Sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N-(N'-benzylaminocarbonyl) sulfanylimide potassium salt are preferred, potassium perfluorobutane sulfate and sodium or potassium diphenylsulfone sulfonate are most particularly preferred.

Mixtures of the named salts are likewise suitable.

These organic flame-retardant salts are utilised in quantities of from 0.01 to 0.1 wt. %, preferably 0.01 to 0.08 wt. %, particularly preferably 0.01 to 0.06 wt. % and most particularly preferably 0.01 to 0.03 wt. % in the molding compositions.

Alongside the salts and PTFE blends, which are to be utilised according to the invention, further additives which are known per se, such as glass fibres, fillers, pigments, UV stabilizers, antioxidants and mold release agents may also be added.

A most particularly preferred embodiment resides in the additional use of inorganic and organic, preferably inorganic, pigments as an additive. This results in further reinforcement of the flame-resistant effect. The present application therefore likewise provides compositions comprising PCs or PECs, the PTFE blends according to the invention and special salts plus at least one inorganic or organic, preferably inorganic, pigment.

The inorganic and organic pigments are in this case utilised in quantities of from 0.01 wt. % to 5 wt. %, preferably from 0.2 wt. % to 4 wt. % and most particularly preferably 0.5 wt. % to 3 wt. %.

Inorganic pigments within the meaning of the invention are metal oxides, sulfur-containing silicates, metal sulfides and metal selenides, complex metal cyanides, metal sulfates, metal chromates and metal molybdates.

Preferred inorganic pigments are white, black, coloured and lustre pigments, which are obtained from inorganic basic materials by chemical and/or physical conversion such as digestion, precipitation, roasting and the like. Titanium white (titanium dioxide), white lead, lithopone, antimony white, manganese black, cobalt black and antimony black, lead chromate, red lead, zinc yellow, zinc green, cadmium red, cobalt blue, Berlin blue, ultramarine, manganese violet, Schweinfurt green, molybdate orange and scarlet chrome, strontium yellow, aluminium oxide, barium sulfate, cerium sulfide, chromium oxides such as chrome orange, chrome red and chrome oxide green, cobalt aluminium oxide, iron oxides such as iron oxide black and red, bismuth vanadate, tin oxide and mixed oxides or sulfides of the cobalt aluminium chromium oxides, sodium aluminium silicon sulfide, titanium chromium antimony oxides and titanium antimony nickel oxides type, might be named as examples.

Organic pigments are, for example, copper phthalocyanines and chlorocopper phthalocyanines.

Titanium dioxide, barium sulfate, iron oxides, chrome oxides and copper phthalocyanines are particularly preferred.

Titanium dioxide is most particularly preferred.

The PC and PEC molding compositions according to the invention may be processed to give flame-proof molded articles and films on the conventional processing machines by known methods within the processing parameters which are conventional for polyester carbonate.

The molding compositions are preferably suitable for injection-molded and extruded articles required to deliver high flame-proof performance.

The moldings are used, for example, in the electrical, electronics, construction, automotive and/or aviation sectors.

EXAMPLES

General:

The Underwriters Laboratories Inc. UL 94 Test "Standard for Tests for Flammability of Plastic Materials for Parts in Devices and Appliances (Edition 5 Oct. 29, 1996)" is known as a conventional method of determining the fire characteristics of poly(ester)carbonate parts. Classification in categories V and 5VB can be obtained in accordance with this standard. A V Test classification with V-0 rating is here considered an effective flame retardancy for poly(ester) carbonates of up to 1.2 mm thickness, and simultaneously passes the 5VB Test at 2.0 mm thickness. In both tests, ignition of the surgical cotton below the sample as a result of the dripping of flaming particles leads to a lower rating or to a test fail. The intensity of flame application and the evaluation of the flaming persistence times [Fpt.]vary between the two tests. In respect of polycarbonate this means in practice that the V Test places greater emphasis on judging the flaming persistence characteristic whereas the 5VB Test evaluates predominantly the dripping characteristic.

Example 1

93 wt. % of an aromatic polycarbonate based on bisphenol A (melt flow rate 10, measured in accordance with ISO 1133/Makrolon 2805) was melted at 280° C. in a twin-screw extruder. A mixture of 6.55 wt. % of an aromatic polycarbonate based on bisphenol A (melt flow rate 6.5, measured in accordance with ISO 1133/Makrolon 3108), which had been ground to powder, 0.05 wt. % perfluorobutane sulfonate potassium salt and 0.4 wt. % PTFE blends prepared from a physical mixture of PTFE and methyl methacrylate/ butyl acrylate copolymer (having approx. 40 wt. % PTFE/ Metablen A-3800) was then dispensed directly into the polycarbonate melt. The polymer extrudate was cooled and granulated. The granules were dried at 80° C. in a vacuum drying cabinet and processed at 280° C. in an injection molding machine to give specimens having the dimensions 127×12×thickness. The test pieces then underwent a flammability test in accordance with the UL 94 standard (flammability of solid plastic samples, Underwriters Laboratories) and were assigned a V-0 flammability rating at a thickness of 1.5 mm. The 5VBB Test was additionally passed at thicknesses of 3.0 and 2.4 mm. The procedure was the same in Examples 2 to 5. The results can be seen in Table 1. Testing of the composition according to Example 6 was carried out in analogous manner with material which comprised additionally titanium dioxide pigment, and passed the 5VBB Test even at 2.0 mm.

Comparison Example 1

93 wt. % of an aromatic polycarbonate based on bisphenol A (melt flow rate 10, measured in accordance with ISO 1133/Makrolon 2805) was melted at 280° C. in a twin-screw extruder. A mixture of 6.7 wt. % of an aromatic polycarbonate based on bisphenol A (melt mass flow rate 6.5, measured in accordance with ISO 1133/Makrolon 3108), which had been ground to powder, 0.05 wt. % perfluorobutane sulfonate potassium salt and 0.25 wt. % of a PTFE powder (100% PTFE Hostaflon TF2021) was then dispensed directly into the polycarbonate melt. The polymer extrudate was cooled and granulated. The granules were dried at 80° C. in a vacuum drying cabinet and processed at 280° C. in an injection molding machine to give specimens having the dimensions 127×12×thickness. The test pieces then underwent a flammability test in accordance with the UL 94 standard (flammability of solid plastic samples, Underwriters Laboratories) and were assigned to flammability class V-2 at thicknesses of 2.4 and 1.5 mm. The 5VBB Test was not additionally passed at thicknesses of 3.0 and 2.4 mm.

The procedure was the same in Examples 2 to 6. The results can be seen in Table 1.

The procedure was the same with Comparison Examples 2 to 6. The results can be seen in Table 1.

TABLE 1

|  | Comparison Examples | | | | | | Examples | | | | | |
|---|---|---|---|---|---|---|---|---|---|---|---|---|
|  | -1 | -2 | -3 | -4 | -5 | -6 | -1 | -2 | -3 | -4 | -5 | -6 |
| Makrolon 2805 | 93 | 93 | 93 | 93 | 93 | 90.45 | 93 | 93 | 93 | 93 | 93 | 90 |
| Makrolon 3108 | 6.55 | 6.65 | 6.7 | 6.95 | 6.5 | 8.9 | 6.55 | 6.57 | 6.55 | 6.45 | 6.475 | 7.65 |
| Salt 1 | 0.2 | 0.1 | 0.05 | 0.05 |  | 0.15 | 0.05 | 0.03 |  | 0.05 | 0.025 | 0.05 |
| Salt 2 |  |  |  |  |  |  |  |  | 0.05 |  |  |  |
| PTFE | 0.25 | 0.25 | 0.25 |  |  |  |  |  |  |  |  |  |
| PTFE blend 1 |  |  |  |  |  |  | 0.4 | 0.4 | 0.4 |  |  |  |
| PTFE blend 2 |  |  |  |  | 0.5 | 0.5 |  |  |  | 0.5 | 0.5 | 0.5 |
| Titanium dioxide |  |  |  |  |  |  |  |  |  |  |  | 1.5 |
| UL94-V | | | | | | | | | | | | |
| 2.4 mm Fpt.* [s] |  | V-2 DOFP* | V-2 DOFP* | V-2 DOFP* |  |  | V-0 13/14 | V-0 15/16 | V-0 14/16 |  |  |  |
| 1.5 mm Fpt.* [s] | V-0 24/13 | V-2 DOFP* | V-2 DOFP* | V-2 DOFP* 45/49 | V-1 65/13 | V-1 | V-0 14/13 | V-0 15/13 | V-0 22/24 |  | V-0 14/15 | V-0 15/11 |
| 1.2 mm Fpt.* [s] | V-1 68/23 |  |  |  |  | V-1 62/26 | V-0 33/21 | V-0 28/16 | V-0 39/35 | V-0 16/10 | V-0 18/15 | V-0 20/10 |
| UL94-5VBB | | | | | | | | | | | | |
| 3.0 mm | Pass | Fail | Fail | Fail | Fail | Fail | Pass | Pass | Pass |  | Pass |  |
| 2.4 mm | Fail |  |  |  | Fail | Fail | Pass | Pass | Fail | Pass | Pass | Pass |
| 2.0 mm |  |  |  |  |  |  | Fail | Fail |  |  |  | Pass |

\* = Flaming persistence time, total burning duration per set (5 × 2 flame applications) after 2 days/7 days
*"DOFP" means Dripping of flaming particles
PC: Makrolon 2805-granules (Bayer AG)
Makrolon 3108-powder (Bayer AG)
Salt 1: Perfluorobutanesulfonate potassium salt
Salt 2: Diphenylsulfone-3-sulfonate potassium salt
PTFE: Hostaflon TF2021
PTFE blend 1: Metablen A-3800 (approx. 40% PTFE CAS 9002-84-0 and about 60% copolyacrylate made from methyl methacrylate and butyl acrylate CAS 25852-37-3 sold by Mitsubishi Rayon)
PTFE blend 2: Blendex B449 (approx. 50% PTFE adn 50% SAN [from 80% styrene and 20% acrylonitril] sold by GEP-A)

As can be easily taken from the examples, especially by comparing comparison example 6 with examples 4 and 6, the compositions according to the invention show an unexpected and surprising high flame resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting of:
   (a) linear poly(ester)carbonate prepared from a diphenol selected from the group consisting of hydroquinone, resorcinol, dihydroxydiphenyl, bis(hydroxyphenyl) alkanes, bis(hydroxyphenyl) cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, (α,α'-bis(hydroxyphenyl) diisopropylbenzenes, compounds thereof which are alkylated in the ring and halogenated in the ring, anc combinations thereof;
   (b) PTFE present in an amount of 0.2 to 0.6% by weight, based on the total weight of said composition, said PTFE being present in the form of a PTFE blend comprising PTFE and a blend partner, said PTFE blend comprising PTFE in an amount of 30 to 70% by weight, based on the total weight of said PTFE blend;
   (c) an organic salt of an alkali metal or alkaline earth metal in an amount of 0.01 to 0.1% by weight, based on the total weight of said composition; and
   (d) optionally an additive selected from the group consisting of glass fibers, fillers, organic pigments, inorganic pigments, UV stabilizers, heat stabilizers, impact modifiers, antioxidants, mold release agents and combinations thereof.

2. The composition of claim 1 wherein the PTFE blend is present in an amount of 0.3 to 0.5%.

3. The composition of claim 1 wherein the sum of PTFE and the organic salt is less then 0.65% relative to the total weight of the composition.

4. The composition of claim 1 wherein said PTFE blend comprises PTFE in an amount of 20 to 70% by weight, based on the total weight of said PTFE blend.

5. The composition of claim 1 wherein the organic salt is present in an amount of 0.01 to 0.08%.

6. The composition of claim 1 wherein at least one of the organic pigment or the inorganic pigment is present in an amount of 0.01 to 5% relative to the weight of the composition.

7. A molded article comprising the composition of claim 1.

8. The composition of claim 1 wherein said blend partner is styrene-acrylonitrile copolymer (SAN).

9. The composition of claim 1 wherein said blend partner is polyacrylate.

10. The composition of claim 1 wherein said organic salt is selected from the group consisting of sodium-2,4,6-trichlorobenzoate, potassium-2,4,6-trichlorobenzoate, N-(p-tolylsulfonyl)-p-toluenesulfimide potassium salt, N-(N'-benzylaminocarbonyl) sulfanylimide potassium salt and combinations thereof.

11. The composition of claim 1 wherein said PTFE blend comprises PTFE in an amount of 30 to 70% by weight, based on the total weight of said PTFE blend.

12. The composition of claim 1 wherein said diphenol, from which said linear poly(ester)carbonate prepared, is selected from the group consisting of 4,4'-dihydroxydiphenyl, 1,1-bis(4-hydroxyphenyl) phenyl ethane, 2,2-bis(4-hydroxyphenyl) propane, 2,2-bis(3,5-dimethyl-4-hydroxyphenyl) propane, 1,1-bis(4-hydroxyphenyl) cyclohexane and 1,1-bis(4-hydroxyphenyl)-3,3,5-trimethyl cyclohexane and combinations thereof.

13. The composition of claim 12 wherein said diphenol is 2,2-bis(4-hydroxyphenyl) propane.

14. A process for preparing a thermoplastic molding composition consisting of blending in a melt,
(i) linear poly(ester)carbonate prepared from a diphenol selected from the group consisting of hydroquinone, resorcinol, dihydroxydiphenyl, bis(hydroxyphenyl) alkanes, bis(hydroxyphenyl) cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, ($\alpha,\alpha'$-bis(hydroxyphenyl) diisopropylbenzenes, compounds thereof which are alkylated in the ring and halogenated in the ring, anc combinations thereof, (ii) PTFE present in an amount of 0.2 to 0.6% by weight, based on the total weight of said composition, said PTFE being present in the form of a PTFE blend comprising PTFE and a blend partner, said PTFE blend comprising PTFE in an amount of 30 to 70% by weight, based on the total weight of said PTFE blend, (iii) an organic salt of an alkali metal or alkaline earth metal in an amount of 0.01 to 0.1% by weight, based on the total weight of said composition, and (iv) optionally an additive selected from the group consisting of glass fibers, fillers, organic pigments, inorganic pigments, UV stabilizers, heat stabilizers, impact modifiers, antioxidants, mold release agents and combinations thereof.

15. The thermoplastic molding composition prepared by the process of claim 14.

* * * * *